United States Patent
Carson

(10) Patent No.: US 9,316,394 B2
(45) Date of Patent: Apr. 19, 2016

(54) HEAT RECOVERY SYSTEM

(71) Applicant: DIRECT CONTACT, LLC, Canton, OH (US)

(72) Inventor: Willliam D. Carson, Tukwila, WA (US)

(*) Notice: Subject to any disclaimer, the term of this patent is extended or adjusted under 35 U.S.C. 154(b) by 147 days.

(21) Appl. No.: 14/206,570

(22) Filed: Mar. 12, 2014

(65) Prior Publication Data

US 2014/0262145 A1 Sep. 18, 2014

Related U.S. Application Data

(60) Provisional application No. 61/777,706, filed on Mar. 12, 2013.

(51) Int. Cl.

| | |
|---|---|
| F01N 5/02 | (2006.01) |
| F23J 15/06 | (2006.01) |
| F28B 5/00 | (2006.01) |
| F28C 3/06 | (2006.01) |
| F28D 3/02 | (2006.01) |
| F28D 7/08 | (2006.01) |
| F28D 21/00 | (2006.01) |

(52) U.S. Cl.
CPC . *F23J 15/06* (2013.01); *F28B 5/00* (2013.01); *F28C 3/06* (2013.01); *F28D 3/02* (2013.01); *F28D 7/082* (2013.01); *F28D 21/0003* (2013.01); *Y02E 20/363* (2013.01)

(58) Field of Classification Search
CPC ............... F23J 15/06; F28B 5/00; F28C 3/06; F28D 3/02; F28D 7/082; F28D 21/0003; Y02E 20/363; Y02T 10/16
USPC ................................... 261/158, 159, 160, 161
See application file for complete search history.

(56) References Cited

U.S. PATENT DOCUMENTS

| 889,201 | A | | 6/1908 | Clark |
|---|---|---|---|---|
| 1,327,599 | A | | 1/1920 | Hunt et al. |
| 1,940,198 | A | | 12/1933 | Wagner |
| 2,972,393 | A | | 2/1961 | Bush |
| 3,148,516 | A | | 9/1964 | Kals |
| 3,169,575 | A | | 2/1965 | Engalitcheff, Jr. et al. |
| 3,249,152 | A | | 5/1966 | Buss et al. |
| 4,196,157 | A | | 4/1980 | Schinner |
| 4,340,572 | A | * | 7/1982 | Ben-Shmuel .......... B01D 53/34 261/151 |
| 4,440,698 | A | | 4/1984 | Bloomer |
| 4,442,049 | A | | 4/1984 | Bloomer |
| 4,799,941 | A | | 1/1989 | Westermark |
| 4,919,696 | A | * | 4/1990 | Higashi .................. B01D 47/06 55/434.4 |
| 4,974,422 | A | | 12/1990 | Kocher |
| 5,510,087 | A | * | 4/1996 | Johnson ................. B01D 51/10 261/108 |
| 5,561,987 | A | * | 10/1996 | Hartfield .................. B01D 1/04 165/117 |
| 5,752,994 | A | * | 5/1998 | Monacelli .................. C10J 3/54 422/146 |
| 6,145,818 | A | | 11/2000 | Herbst |
| 6,470,834 | B1 | * | 10/2002 | Hammer ................... F22B 1/04 122/4 D |

(Continued)

*Primary Examiner* — Charles Bushey
(74) *Attorney, Agent, or Firm* — R. Reams Goodloe, Jr.

(57) ABSTRACT

A system for the recovery of heat from gases. A heat recovery system uses a wetted heat transfer surface to recover heat from a bulk gas, such as a flue gas. The system utilizes wetted heat transfer tubes which are sprayed in a manner to minimize the film thickness of the wetting on the heat transfer tubes. To improve efficiency, the contact liquid used to wet the heat transfer tubes is maintained at a temperature between the temperature of the exiting cooled gas and the temperature of the inlet (cool) process fluid to be heated. Such heat recovery system design criteria enhance performance, and thus enable more efficient heat recovery to be practiced, particularly in systems where combustion gases are encountered.

15 Claims, 2 Drawing Sheets

(56) References Cited

U.S. PATENT DOCUMENTS

| | | |
|---|---|---|
| 6,955,342 B2 | 10/2005 | Carson |
| 7,066,396 B2 | 6/2006 | Knight et al. |
| 7,156,381 B2 | 1/2007 | Carson |
| 7,326,286 B2 | 2/2008 | Okada et al. |
| 2004/0168900 A1 | 9/2004 | Tung |

* cited by examiner

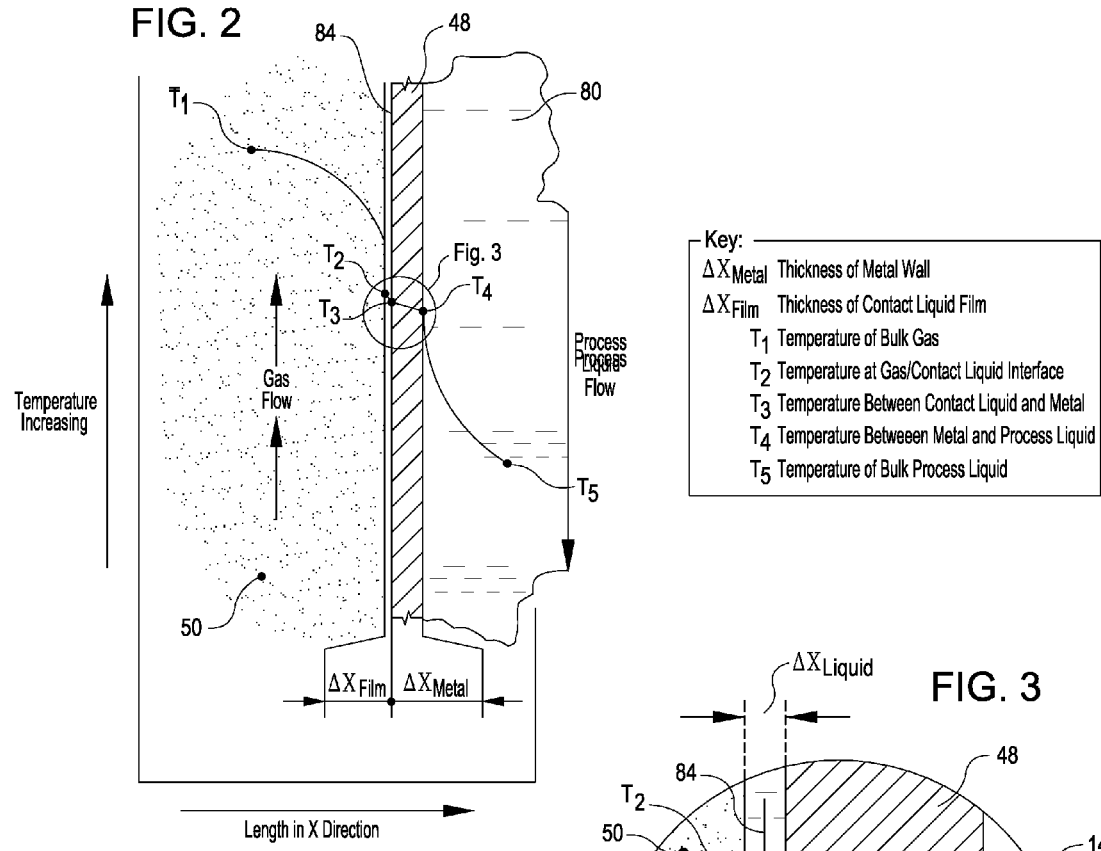
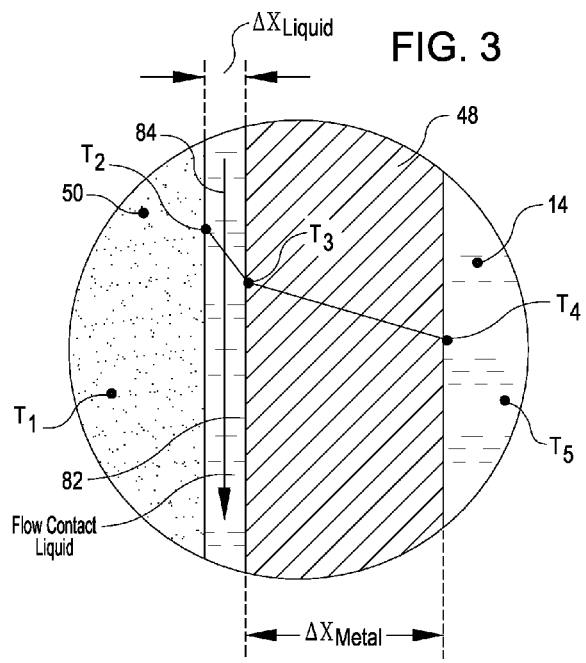

HEAT RECOVERY SYSTEM

RELATED PATENT APPLICATIONS

This application claims priority from prior U.S. Provisional Patent Application Ser. No. 61/777,706, filed Mar. 12, 2013, entitled HEAT RECOVERY SYSTEM, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to systems and methods for the design, construction, and operation of apparatus for the recovery of heat, and the transfer of the heat to a process fluid while using a wetted heat transfer surface, such as when condensing water vapor from a hot gas stream.

BACKGROUND

Various methods and structures have been provided for recovery of waste heat from gas streams. However, in so far as is known to me, various conventional heat recovery systems have generally not optimized the recovery of heat available from the incoming gas stream. For example, traditional prior art indirect coil economizers are relatively inefficient. And, prior art condensing systems for combustion gas streams have not optimized various process elements. Thus, it would be advantageous if a heat recovery system were provided that enabled use of a much higher overall heat transfer coefficient than is presently found in prior art devices such as a standard dry coil economizer.

SUMMARY

A novel heat recovery system design has been developed, and is disclosed herein. The heat recovery system includes a containment chamber or other process vessel which houses a heat exchanger, in which cold process liquid to be heated is flowingly contained. In an embodiment, the heat exchanger may be provided in the form of a coil or tube bundle having a plurality of heat exchange tubes therein. In an embodiment, the tubes in the heat exchanger may be oriented generally horizontally. The process liquid to be heated may be input to the heat exchanger at the upper reaches thereof, for processing in a downward flow configuration. In an embodiment, an incoming hot gas, which in an embodiment has condensable vapors therein, is routed in an upflow configuration, which is counter-current with respect to the process liquid in the heat exchanger. A portion of contact liquid (where the contact liquid may include at least a portion of liquids condensed from condensable vapors in a hot bulk gas), is recirculated from a lower reservoir, through a pre-cooler which adjusts the temperature of the contact liquid downward, to the outer surface of the heat exchanger. The cooling of the contact liquid ensures that a temperature gradient—from cold contact fluid at the top, to hot contact fluid at the bottom, is maintained from top to bottom over the heat exchanger. After cooling, the contact fluid is sprayed on the outer surface of the heat exchanger. By wetting the outer surface of the heat exchanger, but minimizing the thickness of the liquid film on the outer surface of the heat exchanger, heat transfer is optimized. Also, in an embodiment, the contact liquid flows in the same downward direction as the process fluid to be heated, to provide an optimal temperature gradient for heat transfer, with respect to up flowing hot bulk gas. The contact liquid is collected in the liquid reservoir below the heat exchanger is normally at the saturation temperature of the hot gas entering system. In general, by wetting the exterior surface of the heat transfer coil, and by managing the thickness of the resulting liquid film of contact liquid on the outside of the heat transfer coil, to keep the liquid film as thin as possible, it has been found possible to reduce the overall resistance to heat transfer, by converting the outside heat transfer coefficient from a convective heat transfer limited mechanism, to a condensing heat transfer mechanism.

In an embodiment, an innovative condensing heat recovery system is provided in a dual countercurrent flow design. In various embodiments, the heat recovery system may be provided in an dual operating mode, wherein the water to be heated is contained within the heat transfer coils, and does not directly contact the hot gas stream, but wherein the contact liquid wets the outer surface of the heat exchanger, so that the contact liquid directly contacts the incoming gas stream.

BRIEF DESCRIPTION OF THE DRAWING

Various aspects of the developments described herein will be described by way of exemplary embodiments, illustrated in the accompanying drawing figures in which like reference numerals denote like elements, and in which:

FIG. 2 provides a basic process flow diagram for a countercurrent heat recovery apparatus, showing a temperature profile over the process elements, including an upflowing hot exhaust bulk gas feed from which heat is to be removed, a downward flowing thickness of contact liquid including condensate, a metal heat transfer surface, and a downward flowing cold bulk process fluid which is being heated.

FIG. 3 provides in greater detail a portion of FIG. 1 as identified by a circle adjacent a portion of the metal heat transfer surface, showing a temperature profile over key process elements, including the upward flowing bulk gas, a downwardly flowing contact condensing liquid, a metal heat transfer surface, and a bulk process liquid adjacent the metal heat transfer surface.

Figure 1:
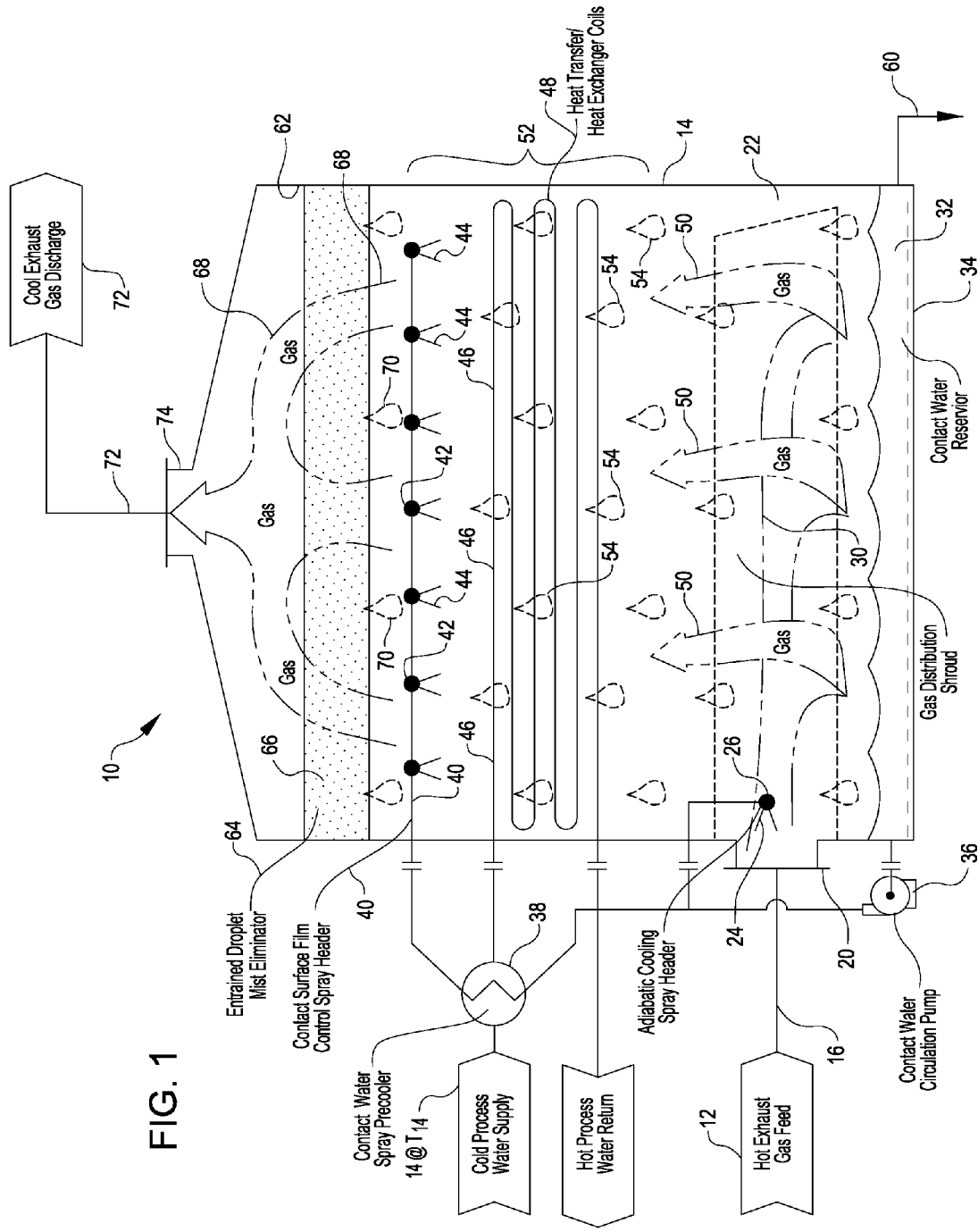
FIG. 1 provides a basic process flow diagram for a countercurrent heat recovery system and for apparatus used in carrying out the process, showing the process flows for hot exhaust bulk gas feed from which heat is to be removed, a supply line for cold process water (i.e., cold bulk process liquid) which is to be heated, a contact liquid (e.g., water) recirculation loop which recirculates a contact liquid (including portion of condensed liquids) from a contact liquid reservoir, through a recirculation pump, precooler, and contact surface film control spray header, and also showing a cool gas exhaust outlet for the outbound gas from which heat has been removed.

The foregoing figures, being merely exemplary, contain various elements that may be present or omitted from actual systems that may be constructed, or methods that may be implemented for design and operation of a system to recover heat while in part condensing a fluid from a hot gas, or to various configurations for installation thereof, or to methods for use thereof. An attempt has been made to draw the figures in a way that illustrates at least those elements that are significant for an understanding of the components of an embodiment for a useful condensing heat recovery system for capturing heat from an incoming hot gas stream and heating a process fluid such as water.

Various other elements of the exemplary heat recovery systems, or for the design, installation and use of the same, may be utilized in order to provide a useful, reliable, and efficient condensing heat recovery system according to the concepts disclosed herein.

DETAILED DESCRIPTION

A novel condensing heat recovery system has been developed. In various embodiments, such a system provides a tremendous upgrade in performance, especially when compared to a traditional prior art indirect coil economizer. The condensing heat recovery system described herein unique, due to use of a dual countercurrent flow pattern, wherein both (a) a contact liquid (e.g., recirculated condensate), and (b) process fluid (e.g., a cold process water stream to be heated) move countercurrent to incoming hot gas (e.g., a hot exhaust gas containing water vapor). In an embodiment, such a design may hereinafter be identified using the term "Dual Countercurrent Flow", or "DCF" heat recovery system. It has been found that a Dual Countercurrent Coil condensing heat recovery system as described herein provides an improvement in the art, and for example, has a much higher overall heat transfer coefficient than a standard dry coil type economizer.

In the DCF heat recovery system design, a contact liquid flows in the same direction as the bulk process liquid to be heated, to insure that an optimum temperature gradient is developed for heat transfer. In an embodiment, as depicted in FIG. 1, such direction is downward. In such case, the contact liquid collected in the reservoir below the heat exchanger is at or very near the saturation temperature of the gas entering the heat exchanger. In an embodiment, the contact liquid is cooled prior to being sprayed over the heat exchanger, which ensures that a selected temperature gradient is maintained from bottom to top over the heat exchanger.

By wetting the exterior surface of the heat transfer coil and providing a spray system to manage the thickness of the resulting liquid film, in order to provide a liquid film thickness profile which is as thin as possible, the thermal heat resistance is minimized through the liquid film adjacent the metal heat transfer surface. In effect, maintenance of a thin liquid film thickness profile of the contact liquid converts the outside heat transfer coefficient—the coefficient through the thin liquid film between the metal heat transfer surface and the incoming hot bulk gas, from a convective heat transfer mechanism to a condensing heat transfer mechanism.

At entry to the heat transfer system, the incoming hot bulk gas stream is initially saturated with vapor by way of contact with contact liquid. This is accomplished through adiabatic cooling, by using a spray header to spray a portion of contact liquid from the reservoir into the incoming hot bulk gas. This process converts sensible heat to latent heat in the hot bulk gas stream. In the process, the temperature of the hot bulk gas is reduced, and the humidity of the hot bulk gas increases, while the enthalpy of the hot bulk gas stream remains constant. To obtain optimum results, the incoming gas should be saturated with vapor, and the heat exchanger (which may be provided in the form of a bundle of horizontally disposed tubes) must be wetted with a thin film of contact liquid, in order to obtain a condensing heat transfer coefficient on the outer surface of the heat exchanger. If the hot bulk gas is not saturated with vapor, such as by way of direct contact spray using a spray header, and spraying the incoming hot bulk gas with contact liquid, then the thin liquid film which is wetting the outer surface of the heat exchanger will evaporate into the hot bulk gas stream.

In an embodiment, some of the unique characteristics of the novel heat recovery system described herein include:

1) conditioning of hot bulk gas to ensure it is thoroughly saturated with by contact liquid, prior to the hot bulk gas contacting the heat exchanger surfaces;
2) cooling of the contact liquid before it is applied to the outside of the upper surface of the heat exchanger, to a contact liquid temperature lower than the saturated cooled bulk gas leaving the heat exchanger, but higher than the cold bulk process liquid entering the heat exchanger; and
3) wetting the outer surface of the heat exchanger thoroughly with contact liquid, but ensuring that the film of contact liquid is not excessively thick, to avoid increased thermal resistance that would occur with a thick film of liquid on the outer surface.

In an embodiment, the hot bulk gas flows upward around the heat exchanger, which may be provided in the form of a tube bundle. In an embodiment, the tubes of the heat exchanger may be oriented horizontally, which is nominally perpendicular to the direction of flow of the hot bulk gas which is being cooled. The bulk process liquid flows inside the heat exchanger, and in an embodiment when using tubes, may serpentine downward from top to bottom. The contact liquid may be sprayed over the outer surface of the heat exchanger, for example wetting the outer surface of the tubes with a very thin liquid film. The contact liquid flows downward from the upper tubes, progressively dripping down from the upper tubes toward the lower tubes. In an embodiment, such a configuration provides for flow of contact liquid that is countercurrent to the flow of the gas stream, and which is driven by gravity. In various embodiments, the path of flow of the gas stream may be configured or controlled to enter the heat exchanger section of one or more containment chambers with a generally vertical orientation, with minimal residual horizontal component of gas flow.

Attention is directed to FIG. 2, which provides an overview of the mechanism for heat transfer for a simplified heat recovery system as described herein. For illustrative purposes only, and not by way of limitation, the apparatus is depicted as if heat is transferred through a flat plate of metal. Note, for example, that heat exchangers may be provided in various configurations, whether metal tubes, coils, flat plates, or other configurations as will be understood by those of skill in the art. As illustrated in FIG. 2, the bulk process liquid to be heated (at the right) flows downward, and hot bulk gas (to be cooled) flows upward (at the left), on either side of a heat transfer medium, such as a metal plate (as shown), or alternately for example, a tube. Also a contact liquid and accompanying condensate flow will flow downward, as a film on the gas side (at the left) of the heat transfer medium, which again, as illustrated is a metal plate.

The flow of heat as depicted in FIG. 2 is thus from left to right, and may be appreciated by reference to the temperature curve, where the temperature at five different places is noted, with decreasing temperatures from:

$T_1$ (temperature of the hot bulk gas flow), to
$T_2$ (at the gas/contact liquid film interface), to $T_3$ (at the inner edge of the film, at contact between liquid and metal); to $T_4$ (temperature between metal and the process liquid); and to $T_5$ (temperature of the bulk process liquid).

As just noted, the temperature drop from $T_1$ to $T_2$ is from the hot bulk gas to the edge of the contact liquid film, at the gas/contact liquid film interface. The heat transfer in this region includes a combination of convective and condensing heat transfer mechanisms.

The temperature drop from $T_2$ to $T_3$ is through the contact liquid film, from the gas/liquid film interface to the outer surface of the heat exchanger. The liquid film is flowing downward along the outer surface of the heat exchanger metal wall. Importantly, the contact liquid film is in laminar flow, and thus the heat transfer mechanism is mainly conductive through the liquid film.

The temperature drop from $T_3$ to $T_4$ is through the metal wall of the heat exchanger. Heat transfer through the metal is primarily conductive.

The temperature drop from $T_4$ to $T_5$ is from the interior surface of the metal wall of the heat exchanger to the bulk of the process liquid. In this region, the heat transfer mechanism is convective.

Heat flux through each of the above noted regions is a function of differential temperatures between the noted locations. For example, the expression $[\Delta T = T_1 - T_2]$ indicates that such delta T is the differential between the temperature at $T_1$ as compared to the temperature at $T_2$. As used, the subscripts indicate specific points in the system, as just noted above. Such differential temperatures occur either across a specific distance through a solid or through a laminar fluid where a conductivity heat transfer mechanism is at work (expressed as $[q = k/\Delta X(\Delta T)]$, further discussed below), or across an unspecified distance between solid and fluid interface, wherein a convective heat transfer mechanism is at work (expressed as $[q = h(\Delta T)]$, further discussed below. In any event, refer to Appendix A for definitions of various constants and variables.

In the heat recovery system described herein these four (4) differential temperatures as just described above correspond to a series of four (4) resistances. In each of the four cases, both the heat transfer flux (that is, the amount of heat transferred, see below), and the heat transfer area, are constant. Thus, the heat transfer, "q", may be expressed at each case, as follows:

1) Bulk gas to contact fluid film: $q = h_o \times [T_1 - T_2]$
2) Through contact fluid film $q = k_{liquid}/\Delta X_{liquid} \times [T_2 - T_3]$
3) Through metal $q = k_{metal}/\Delta X_{metal} \times [T_3 - T_4]$
4) Metal surface to bulk process liquid $q = h_i \times [T_4 - T_5]$ Thus, the overall thermal resistance is: $[1/U_o = (T_1 - T_5)/q]$.

Equating the above noted thermal resistance for each case, to the overall thermal resistance, may be done according to the following equations:

$$(T_1 - T_5)/q = (T_1 - T_2)/q + (T_2 - T_3)/q + (T_3 - T_4)/q + (T_4 - T_5)/q$$

$$1/U_o = 1/h_o + \Delta X_{liquid}/k_{liquid} + \Delta X_{metal}/k_{metal} + 1/h_i$$

(for a series of resistances)

The individual resistances combine to produce an overall resistance. Thus, it can be seen that the highest individual resistance to heat transfer will dominate the overall heat transfer achievable. This is analogous to the situation in a series of electrical resistors, where the resistor with the highest resistance will control current flow.

Considering variables for each resistance just noted above:

In the $T_1$ to $T_2$ region:

Here, $[1/h_o]$, and is where "$h_o$" is a function of Prandtls number and Reynolds number. These items are dependent of the physical conditions of incoming hot gas and the condensing vapor, specifically: heat capacity, thermal conductivity, viscosity, dry components, humidity, gas mass flow rate and contact liquid flow rate. The geometry of the heat exchanger, whether a coil or other shape, and direction of incoming hot gas flow can be manipulated to reduce the resistance in $1/h_o$ but physical characteristics of the gas are fixed, the only exception being humidity. The incoming hot gas can be saturated with contact liquid (typically this may be carried out adiabatically, and this increases the "$h_o$", but reduces inlet gas temperature). The reduction in inlet temperature is overcome by a greater increase in "$h_o$" (i.e., reducing resistance—$1/h_o$). Increase of contact liquid flow increases "$h_o$".

In the $T_2$ to $T_3$ region:

Here, $[\Delta X_{liquid}/k_{liquid}]$ and where liquid thermal conductivity is basically fixed, the film thickness controls resistance. The thermal conductivity is dependent on film temperature, as constrained by conditions. The thickness of the contact liquid film $[\Delta X_{liquid}]$ is directly proportional to the mass flow rate of the contact liquid.

In the $T_3$ to $T_4$ region:

Here $[\Delta X_{metal}/k_{metal}]$ and the metal thickness and metal conductivity are fixed. The metal thermal conductivity is dependent on the material and the thickness is dependent on structural requirements.

In the $T_4$ to $T_5$ region:

Here $[1/h_i]$, is where "$h_i$" is a function is Prandtls number and Reynolds number. These items are dependent on the physical conditions of the process liquid: heat capacity, thermal conductivity, viscosity, and liquid mass flow rate of the process liquid to be heated.

A number of variables are at work in any given heat recovery system. For a process like that described herein, which utilizes a condensing heat transfer, a key variable is the heat transfer which occurs across the contact liquid film, at which vapors are condensed. Overall, the fluid thickness of the contact liquid film has a large impact on the amount of heat transfer which can be accomplished with a particular apparatus. However, it appears that in prior art heat recovery systems, little or no consideration has been given to the contact liquid flow rates, or to the contact liquid film thickness. Thus, it appears that other designers of indirect contact condensing heat recovery systems have not appreciated the importance of the thickness of the contact liquid film, where condensation of vapors from the bulk gas occurs.

Additionally, to ensure that the heat exchanger has a high outer surface condensing heat transfer coefficient, as described above, the outer surface of the heat exchanger must be thoroughly wetted with contact liquid. In an embodiment, such wetting may be accomplished by spraying the outer surface of the heat exchanger. Such contact liquid may be recirculated from a reservoir located below the heat exchanger.

The contact liquid captured in the reservoir is normally at or slightly below the wet bulb temperature of the incoming gas stream. That web bulb temperature is much higher than that of the cool gas stream leaving the heat exchanger. Thus, if contact liquid removed from the reservoir is not cooled prior to being sprayed over the heat exchanger, and thus into the cool gas stream leaving the heat exchanger, then both the temperature and the humidity of the cool gas stream will be increased, as it mixes with the spray of contact liquids to the outer surface of the heat exchanger, transferring both sensible and latent heat to the cool gas stream. Additionally, if the liquid droplets which are sprayed on the heat exchanger were hotter than the outgoing cool gas that is contacting the contract liquid film on the outer surface of the heat exchanger, then the thermal driving force would be disrupted.

In order to avoid the possible design difficulties just mentioned above, in an embodiment, it has been determined that the contact liquid used to wet the outer surface of the heat exchanger, as described above, should have its temperature maintained between a first temperature at which the process fluid to be heated enters the heat recovery system, and a second temperature at which the cool gas stream exits the heat recovery system. In an embodiment, such temperature range control is provided with an external heat exchanger, normally described as a contact liquid precooler. In so far as I am aware, it appears that others have not considered the value of maintaining the temperature within these temperature ranges, evidently not appreciating its significance.

In the design of various embodiments for heat recovery systems as described herein, it is preferable that the options for various components are thoroughly considered, in order to optimize heat transfer actually achieved. Such considerations and options include:
(1) The heat exchanger design should preferably include consideration of good gas and liquid distribution, tube pitch, pitch orientation, tube size, material, extended surfaces gas size, number of tube circuits, and number of circuit pass per row of tubes, (or if using plates, then the spacing and nature of surface geometry); and
(2) the heat sinks and heat sources should be evaluated to determine the optimum split between sensible and latent heat recovery devices. Once we have made that determination, we adiabatically cool and saturate the gas prior to it entering the condensing heat recovery coil. Thus, it is ensured that a condensing heat transfer surface, such as the outer surface of a heat exchanger as described herein, is wetted.

In addition to detailed design with respect to the items just mentioned above, in order to optimize a condensing heat recovery system, the design should specify how to manage the delivery of contact liquid to the outer surface of the heat exchanger, where condensation occurs. Thus, considerations in the design of a spray system for the spray of contact liquid may include:
(1) Circulating the contact liquid at a rate that maintains a desired, minimum contact liquid film thickness; and
(2) cooling the contact liquid, before spraying on the outer surface of the heat exchanger, so that its temperature is maintained between a first temperature at which the process fluid to be heated enters the heat recovery system, and a second temperature at which the cool gas stream exits the heat recovery system.

These two variables, when controlled, will make a heat recovery system as described herein considerably more efficient than prior art systems.

Turning now to FIG. 1, a heat recovery system 10 is provided. A hot gas stream 12 is sent to the heat recovery system 10 for removal of heat therefrom, and for heating a cold process liquid 14, such as cold process water supply water. In various embodiments, the hot gas stream 12 may be from a boiler, or from an engine, or from a process gas stream in an industrial plant, or from any other hot gas source in which condensable vapors are provided within a suitable operational condensing temperature range. Such hot gas 12 may include as primary constituents, water vapor, carbon dioxide, nitrogen, and a little oxygen, for example, in a typical boiler stack application. The hot gas 12 is provided to one or more containment chambers 14 of the heat recovery system 10, through a hot gas conduit 16. Heat recovery system containment chambers 14 may be fabricated using conventional fabrication techniques in variety of configurations, such as in a vertically standing generally parallelepiped shaped structure, or in a vessel structure such as a generally cylindrical housing. However, any convenient and cost effective shapes may be utilized, and any of such equivalent structures may be utilized according to the teachings herein in a method of achieving heat recovery using condensation on heat exchanger in a heat recovery system.

The hot gas stream 12 arrives at the heat recovery system 10 at an inlet 20, located in the lower portion 22 of the heat recovery system containment chambers 14. The hot gas stream 12 is met with an adiabatic cooling spray 24 delivered by first spray header 26. The hot gas 12 is adiabatically cooled and humidified by the spray 24. The incoming path of the hot gas 12 after the spray header 26 is indicated by reference numeral 30. Below the incoming path 30 of the hot gas 12 is a contact liquid 32 reservoir 34 that acts to contain a pool of condensate. The contact liquid 32 is removed from the reservoir 34 by recirculation pump 36 and sent through a precooler 38. From the precooler 38, the contact liquid 32 is sent to a second spray header 40, which is the contact surface film control spray header 40. A plurality of spray nozzles 42 each send a spray 44, which may be provided as selected pattern of cooled contact liquid 32 downward toward an outer surface 46 of heat exchanger 48.

After entry into heat transfer system 10 containment chamber 14, the hot gas 12 gas turns upward in the direction of reference arrows 50, and enters the contact section 52, where it (a) passes through spray 44 or droplets 54 of contact liquid 32, and (b) through the tubes of heat exchanger 48 in countercurrent fashion with respect to (1) the downwardly falling spray 44 or droplets 54 of contact liquid 32, and (2) the process liquid 14 that is being heated in the heat exchanger 48. Droplets 54 fall by gravity into the reservoir 34, and are recycled as contact liquid 32. Excess contact liquid 32 (i.e. accumulated condensate) may be discharged at exit pipe 60, and sent to a suitable process for use, or to a sewer or other appropriate point for discharge, in order to maintain a selected level of contact liquid 32 in the reservoir 34. Since the contact liquid 32 may, in an embodiment, be substantially made up of clean condensate formed at said thin film 84, and when water is the condensate, the water quality of contact liquid 32 may be quite good.

At the upper end 62 of the one or more containment chambers 14, a mist eliminator 64 is provided. The mist eliminator may have a plurality of baffle(s) such as chevrons 66 or the like, to assist in impinging and/or intercepting droplets, by providing a tortuous gas pathway through which the exiting cooled gas 68 must flow, in order to minimize loss of moisture such as droplets 70 via entrainment. A cleaned cool gas stream 72 exits the one or more containment chambers 14 at outlet 74.

The heat exchanger 48 has an interior fluid passageway 80 (see FIG. 2) and an outer surface 82 (see FIG. 3). The outer surface 82 is wetted with a contact liquid 32 via spray nozzles 42 to establish a thin film 84 of contact liquid 32 on the outer surface 82. The cold process liquid 14 is provided a first temperature $T_{14}$. The process liquid 14 is passed through the heat exchanger 48 to heat the process liquid 14, while passing the incoming gas stream 12 upward past the outer surface 82 of the heat exchanger 48, is shown by reference arrows 50, in a manner counter-current to the direction of flow of the process liquid 14, to cool the incoming gas stream 12 and forming at least some condensate at the thin film 84, to produce a cool gas stream 68 at a second temperature $T_{68}$. In an embodiment, the thin film 84 of contact liquid 32 and associated condensate flows in a direction counter-current to the upwardly incoming hot bulk gas 50.

As noted above, at least some of the contact liquid 32 from the reservoir 34 is recycled to the spray nozzles 42. The recycled contact liquid 32 is cooled while in transit between reservoir 34 and spray nozzles 42, to a spray temperature $T_{44}$ which temperature is between the first temperature $T_{14}$ of the process liquid and a second temperature $T_{68}$ of the cool gas stream 68.

In the foregoing description, numerous details have been set forth in order to provide a thorough understanding of the disclosed exemplary embodiments for providing a process for the recovery of heat using wetted heat transfer surfaces, and in particular, for capturing heat from combustion gases. However, certain of the described details may not be required in order to provide useful embodiments, or to practice selected or other disclosed embodiments. Further, the description may include, for descriptive purposes, various relative terms such as surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various items in the apparatus and in the method(s) described herein may have been described as multiple discrete items, in turn, in a manner that is most helpful in understanding such aspects and details. However, the order of description should not be construed as to imply that such items or sequence of operations are necessarily order dependent, or that it is imperative to fully complete one step before starting another. Further, certain details of the methods described may not need to be performed in the precise or exact order of presentation herein.

In different embodiments, one or more items may be performed simultaneously, or eliminated in part or in whole while other items may be added. Also, the reader will note that the phrase "an embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

APPENDIX A

| SYMBOL | Definitions of Constants and Variables | |
|---|---|---|
| | Name | Units |
| Q | Heat Load [=] | Energy/Time |
| A | Heat Transfer Cross-Sectional Area [=] | Length$^2$ |
| q = Q/A | Heat flux [=] | Energy/Time-Length$^2$ |
| $k_{liquid}$ | Thermal Conductivity of Liquid [=] | Energy/Time-Length-Temp. |
| $k_{metal}$ | Thermal Conduction of Metal [=] | Energy/Time-Length-Temp. |
| ho | Heat-Transfer Coefficient [=] (Convective) | Energy/Time-Length$^2$-Temp |
| hi | Heat-Transfer Coefficient [=] (Convective) | Energy/Time-Length$^2$-Temp |
| $\Delta X_{liquid}$ | Thickness of Liquid on Gas side Surface [=] | Length |
| $\Delta X_{metal}$ | Thickness of Metal Wall [=] | Length |
| T | Temperature [=] | Temp |
| $\Delta T$ | Temperature [=] | Temp. |

The invention claimed is:

1. A method for recovery of heat from a gas stream, comprising:
    adiabatically cooling and humidifying an incoming gas stream;
    providing a heat exchanger having an interior fluid passageway and an outer surface, and wetting the outer surface with contact liquid via spray nozzles to establish a thin film on the outer surface;
    providing a process liquid at a first temperature, and passing the process liquid through said heat exchanger to heat the process liquid while passing the incoming gas stream past the outer surface of the heat exchanger and counter-currently to the process liquid, to cool the incoming gas stream and forming at least some condensate at said thin film, and to produce a cool gas stream at a second temperature;
    flowing said contact liquid and associated condensate counter-current to said incoming hot bulk gas, and collecting said contact liquid and condensate in a reservoir; and
    recirculating at least some of the contact liquid from said reservoir to said spray nozzles, while cooling said contact liquid between said reservoir and said spray nozzles to a temperature between said first temperature of said process liquid and said second temperature of said cool gas stream.

2. A method according to claim 1, wherein adiabatically cooling the incoming gas stream is accomplished by obtaining a portion of contact liquid from said reservoir before cooling, and spraying said portion of contact liquid into said incoming gas stream.

3. A method according to claim 1, wherein said heat exchanger comprises coils of tubes.

4. A method according to claim 3, wherein said heat exchanger is oriented horizontally and wherein said spray nozzles are directed downwardly at said heat exchanger.

5. A method according to claim 4, wherein said reservoir is located below said heat exchanger.

6. A method according to claim 1, further comprising passing the cool gas stream through a mist eliminator, before discharge of said cool gas stream.

7. A method according to claim 1, wherein a portion of said contact liquid in said reservoir is discharged, to maintain a selected level in said reservoir.

8. A method according to claim 1, wherein said contact liquid comprises water.

9. A method as according to claim 8, wherein said water comprises clean condensate formed at said thin film.

10. A method according to claim 1, wherein said process liquid comprises water.

11. A method according to claim 1, wherein said hot gas comprises a gas having water vapors therein.

12. The method as set forth in claim 1, wherein said hot gas comprises an exhaust gas from combustion of a fuel.

13. The method as set forth in claim 12, wherein said hot gas comprises stack gas from a boiler.

14. The method as set forth in claim 12, wherein said hot gas comprises exhaust from an engine.

15. The method as set forth in claim 12, wherein said hot gas comprises a process gas stream from an industrial process plant.

* * * * *